(12) United States Patent
Kim et al.

(10) Patent No.: US 6,512,668 B1
(45) Date of Patent: Jan. 28, 2003

(54) TANTALUM CHIP CAPACITOR WITH CUT-GROOVED LEAD FRAME

(75) Inventors: Jae Kwang Kim, Kyungki-do (KR); Hyun Sub Oh, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 10/076,309

(22) Filed: Feb. 19, 2002

(30) Foreign Application Priority Data

Nov. 28, 2001 (KR) ........................................ 2001-74640

(51) Int. Cl.$^7$ .............................................. H01G 9/042
(52) U.S. Cl. ...................................... 361/509; 361/529
(58) Field of Search .................................. 361/509, 508, 361/510, 516, 528, 529, 532

(56) References Cited

U.S. PATENT DOCUMENTS 6,343,005 B1 * 1/2002 Tadanobu et al. ............ 361/504

FOREIGN PATENT DOCUMENTS

| JP | 8-195330 | * | 7/1996 |
| JP | 8-316104 | * | 11/1996 |

OTHER PUBLICATIONS

Japanese Patent Abstract Publication No. 02–087612, Publication Date Mar. 28, 1990.

* cited by examiner

*Primary Examiner*—Anthony Dinkins
(74) *Attorney, Agent, or Firm*—Lowe Hauptman Gilman & Berner, LLP (57) ABSTRACT

A tantalum chip capacitor with a cut-grooved anode lead frame is disclosed. The cut-grooved lead frame is designed to allow the tantalum element set in the small-sized epoxy mold package of the capacitor to have a desired size, thus restricting an increase in impedance of the tantalum chip capacitor regardless of a reduction in the size of the package according to the recent trend of smallness of the tantalum chip capacitors. This tantalum chip capacitor has a tantalum element, a anode lead wire extending from the tantalum element, and a cathode lead frame attached at its inside end to the tantalum element and forming a mounting terminal at its outside end. The cut-grooved anode lead frame is welded at its inside end to the lead wire while overlapping a part of the lead wire at the inside end having the cut groove. This anode lead frame also forms a mounting terminal at its outside end. A mold package encloses the tantalum element, the lead wire, a part of the cathode lead frame attached to the tantalum element, and a part of the anode lead frame welded to the lead wire.

3 Claims, 7 Drawing Sheets

PRIOR ART
FIG. 1

PRIOR ART

FIG. 2

PRIOR ART

TANTALUM CHIP CAPACITOR WITH CUT-GROOVED LEAD FRAME

BACKGROUND OF THE INVENTION

1. Field of the Invention

The present invention relates, in general, to tantalum chip capacitors with lead frames and, more particularly, to a tantalum chip capacitor with a cut-grooved anode lead frame designed to allow a tantalum element set in a small-sized resin mold package of the capacitor to have a desired size, thus restricting an increase in impedance of the tantalum chip capacitor regardless of a reduction in the size of the package according to the recent trend of smallness of the tantalum chip capacitors.

2. Description of the Prior Art

As well known to those skilled in the art, tantalum chip capacitors have been widely used in a variety of applied circuits operated, with low rated voltages, in addition to a variety of industrial electronic equipments. Particularly, such tantalum chip capacitors have been preferably used in circuits, the operational performances of which are determined by their frequency characteristics. In the prior art, portable communication equipments typically use such tantalum chip capacitors for accomplishing a noise reduction.

Figure 1:
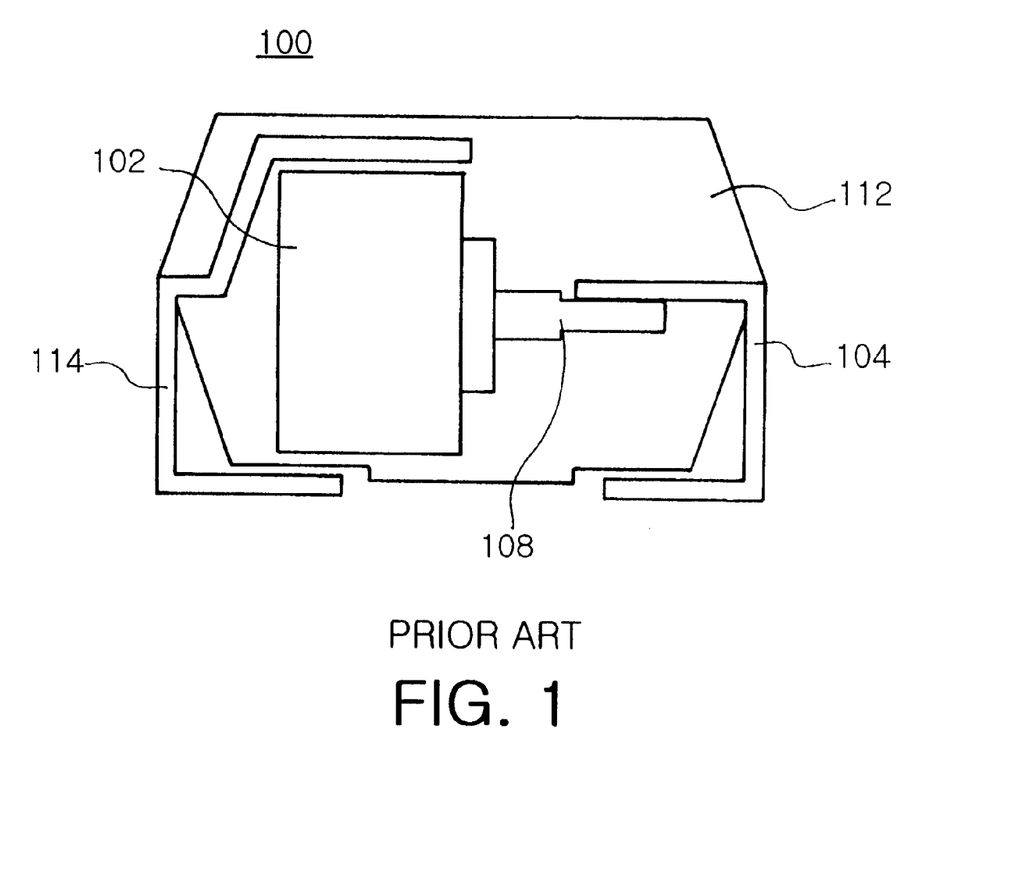
FIG. 1 is a sectional view showing the construction of a conventional tantalum chip capacitor.
Figure 2:
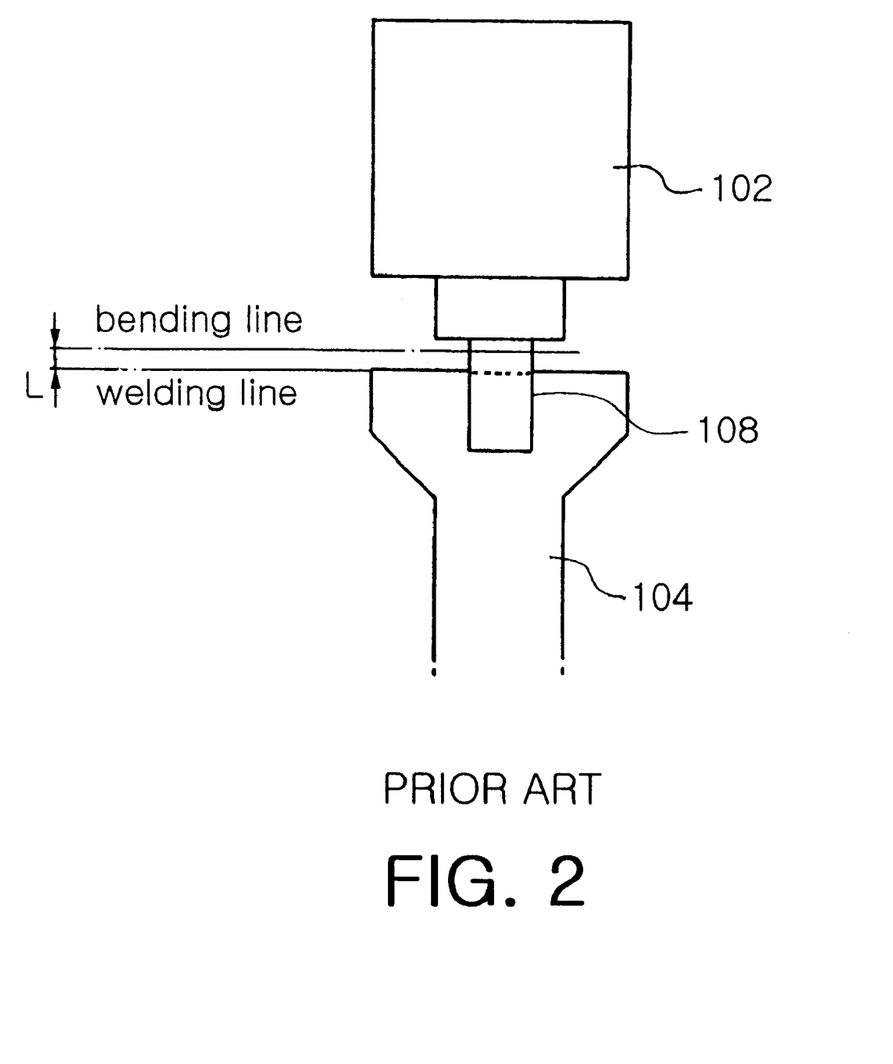
FIG. 2 is a plan view showing an anode lead frame and a tantalum element of the conventional tantalum chip capacitor, which are welded to each other.
Figure 3:
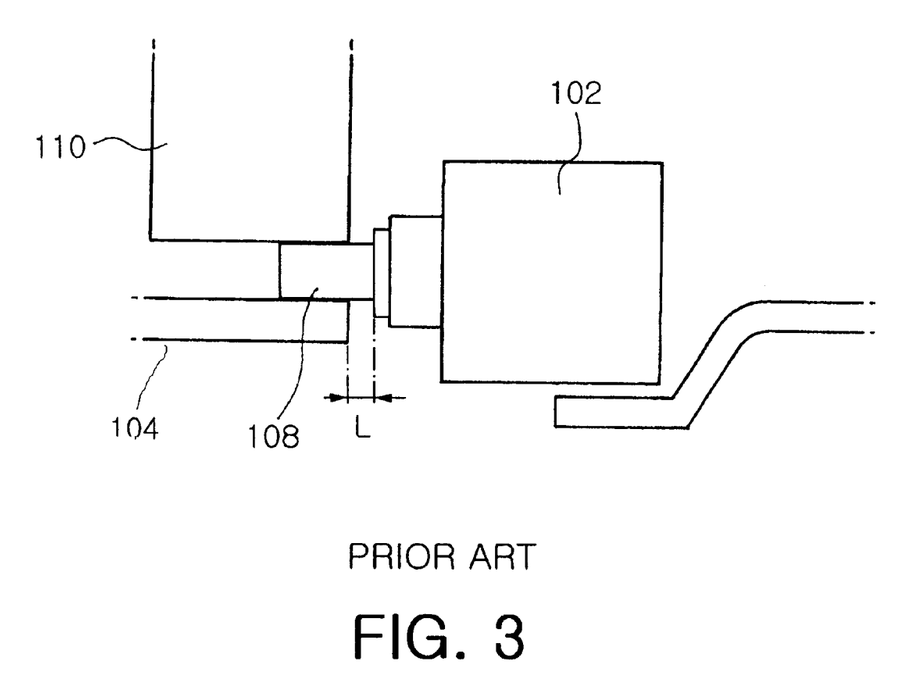
FIG. 3 is a view showing a process of welding the anode lead frame to the tantalum element of the conventional tantalum chip capacitor.
Figure 4:
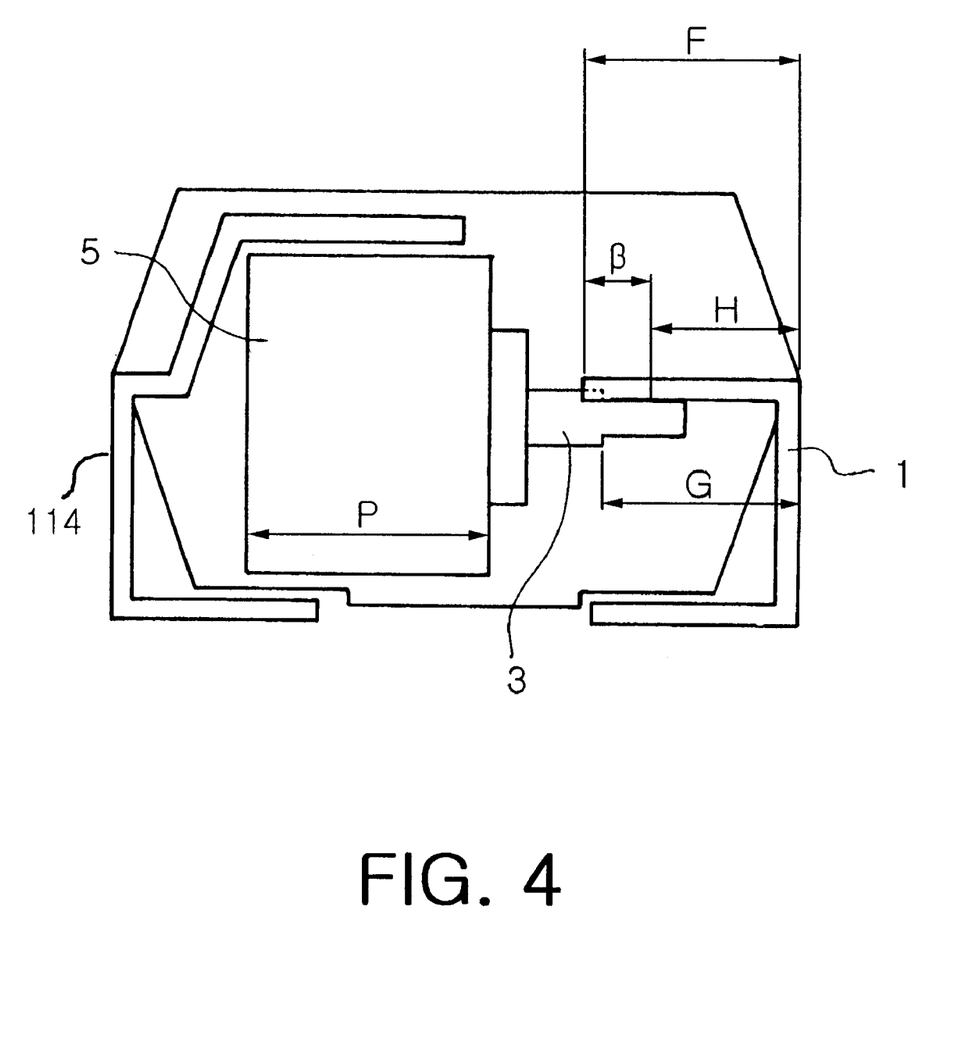
FIG. 4 is a sectional view showing the construction of a tantalum chip capacitor with a cut-grooved anode lead frame in accordance with the preferred embodiment of the present invention.

As shown in FIGS. 1 and 2, a conventional tantalum chip capacitor 100 includes a tantalum element 102, which is set in a resin mold package 112 at a predetermined position. A anode lead wire 108 integrally extends from the tantalum element 102, while the inside end of the anode lead frame 104 is welded to the anode lead wire 108 into a single body and extends to the outside of the package 112. The tantalum chip capacitor 100 also has a cathode lead frame 114, wherein its inside end is attached to the tantalum element 102 and its outside end extends to the outside of the package 112. The inside end of the anode lead frame 104 has a straight edge as shown in FIG. 3, so it may be called hereinafter "a straight lead frame". The anode lead wire 108 is welded to the straight lead frame 104 through a spot welding process using an electrode welding rod 110 as shown in FIG. 4 after partially overlapping the lead wire 108 on the lead frame 104.

In order to spot-weld the straight lead frame 104 to the anode lead wire 108, it is necessary to make the upper and lower parts of the end of the anode lead wire 108 into flat surfaces. This process is called "bending process" and the boundary between the flat surfaces and un-pressed part is called "bending line". Each of the flat surfaces starts at a bending line and is terminated at the end of the lead wire 108, and acts as a contact surface for the welding. The bending line is formed on the anode lead wire 108 by applying pressure to the lead wire 108 before the spot welding process. When the lead frame 104 is welded to the anode lead wire 108, the straight edge of the lead frame 104 is laid on the upper flat surface of the anode lead wire 108 along a welding line, thus defining a welded area starting at the welding line and terminated at the outside end of the lead wire 108. In such a case, the welding line is spaced apart from the bending line by a distance "L" as shown in FIGS. 3 and 4. After the lead frame 104 is welded to the lead wire 108 into a single body, an epoxy molding process is performed to form the package 112 enclosing the tantalum element 102, the anode lead wire 108, the anode lead frame 104, and the cathode lead frame 114.

In accordance with the recent trend of compactness and smallness of electronic equipments, it has been necessary to reduce the size of such tantalum chip capacitors. However, in the prior art, such a small-sized tantalum chip capacitor is problematic in that it reduces the size of the tantalum element 102 due to the straight lead frame 104 inevitably occupying substantial space inside the small-sized package 112. When the size of the tantalum element 102 is reduced as described above, the capacitance of the tantalum chip capacitor is reduced. Such a reduction in the capacitance results in an undesirable increase in impedance of the tantalum chip capacitor.

In conventional small-sized tantalum chip capacitors having the straight anode lead frames, it is almost impossible to reduce the size of the straight lead frame. That is, when the straight anode lead frame is reduced in its size in an effort to prevent a reduction in the size of the tantalum element, the package cannot firmly hold the anode lead frame and allows the lead frame to be easily removed from the capacitor. Therefore, the straight anode lead frame must maintain a sufficient size, so the lead frame undesirably occupies substantial space inside the package when the capacitor size is reduced to accomplish the recent trend of smallness of the tantalum chip capacitor.

SUMMARY OF THE INVENTION

Accordingly, the present invention has been made keeping in mind the above problems occurring in the prior art, and an object of the present invention is to provide a tantalum chip capacitor which has a cut-grooved anode lead frame welded to the anode lead wire of a tantalum element at a welded area moved outward from a position of the conventional welded area, thus resulting in the enlargement of the tantalum element size.

Another object of the present invention is to provide a tantalum chip capacitor, which restricts an increase in its impedance regardless of a reduction in the size of its package according to the recent trend of smallness of tantalum chip capacitors, and which thus has improved performance.

In order to accomplish the above objects, the present invention provides a tantalum chip capacitor, comprising: a tantalum element, produced using tantalum oxide as a dielectric substance; an anode lead wire extending outward from a side surface of the tantalum element, and having flat surfaces on the upper and lower surfaces of the end portion thereof; a cathode lead frame the inside end of which is attached to the tantalum element and the outside end of which forms a mounting terminal for surface-mounting the tantalum chip capacitor on a circuit board; an anode lead frame having a cut groove at the center of the inside end thereof, the inside end being welded to the lead wire at the overlapped part of the upper flat surface of the lead wire and the inside end having the cut groove, the outside end forming a mounting terminal for surface-mounting the tantalum chip capacitor on the circuit board; and a mold package enclosing the tantalum element, the lead wire, a part of the cathode lead frame attached to the tantalum element, and a part of the anode lead frame welded to the lead wire.

In the tantalum chip capacitor of this invention, the cut groove may have a V-shaped profile or an arc-shaped profile. In addition, the cut groove has a depth set to 4%~50% of a reference length which is the length of the part of the anode lead frame enclosed in the package.

BRIEF DESCRIPTION OF THE DRAWINGS

The above and other objects, features and other advantages of the present invention will be more clearly understood from the following detailed description taken in conjunction with the accompanying drawings, in which:

FIGS. 5a and 5b are views showing the cut-grooved anode lead frame and a, tantalum element of the tantalum chip capacitor of this invention, in which:

DETAILED DESCRIPTION OF THE INVENTION

Reference now should be made to the drawings, in which the same reference numerals are used throughout the different drawings to designate the same or similar components.

Figure 5A:
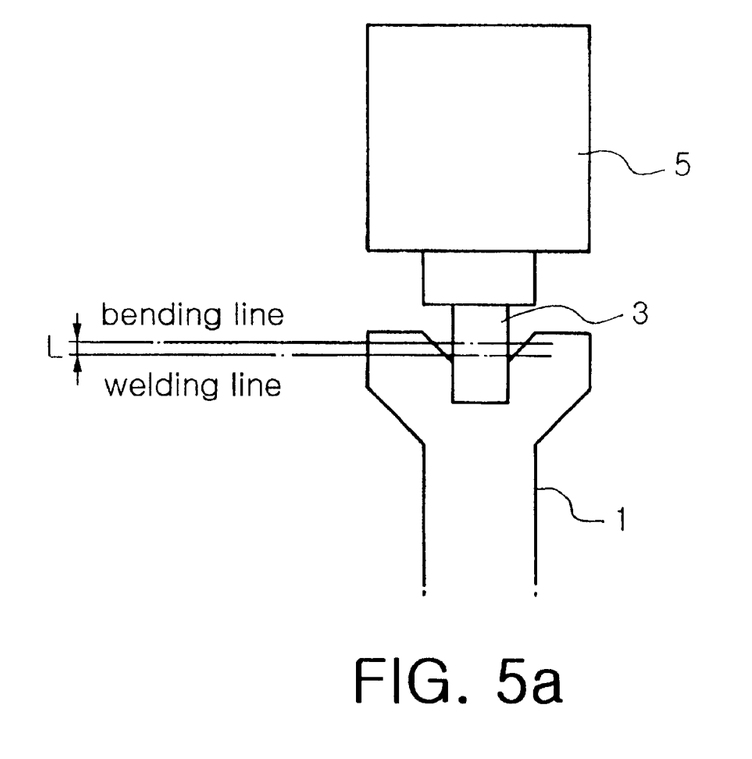
FIG. 5a is a plan view showing the cut-grooved anode lead frame and the tantalum element welded to each other.
Figure 5B:
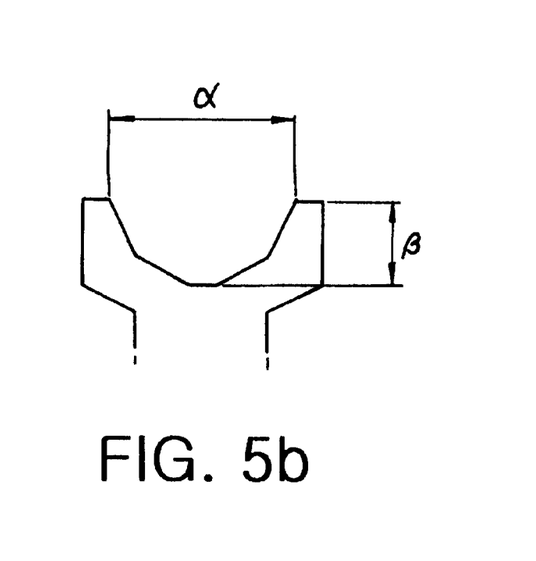
FIG. 5b is a plan view of the cut-grooved lead fame.

FIG. 4 is a sectional view showing the construction of a tantalum chip capacitor with a cut-grooved anode lead frame in accordance with the preferred embodiment of the present invention. FIG. 5a is a plan view showing the cut-grooved anode lead frame and a tantalum element of the tantalum chip capacitor welded to each other. FIG. 5b is a plan view of the cut-grooved lead frame. In the tantalum chip capacitor of this invention, the tantalum element 5 is produced using tantalum oxide ($Ta_2O_2$) as its dielectric substance.

As shown in FIGS. 4, 5a and 5b, the structurally improved anode lead frame 1 of the tantalum chip capacitor according to this invention has a cut groove at the center of the edge of its inside end. The anode lead frame 1 will be thus so-called "a cut-grooved lead frame" so as to distinguish it from the conventional straight lead frame. The inside end of the anode lead frame 1 is welded to an anode lead wire 3 of the tantalum element 5 after partially overlapping the wire 3 on the lead frame 1, and its outside end forms a mounting terminal for surface-mounting the tantalum chip capacitor on a circuit board. In the present invention, the cut-grooved anode lead frame 1 may be designed such that the cut groove has a V-shaped profile. Alternatively, the cut-grooved lead frame 1 may be designed such that the cut groove has an arc-shaped profile. In addition, the lead frame 1 may be designed such that the welded area of the lead frame 1 has a flat surface, but the other area except for the welded area is inclined at an angle of about 45°.

The anode lead wire 3 is subjected to a pressing process (bending process) to make flat surfaces on the upper and lower surfaces thereof at the welded area. At the upper flat surface, the lead: wire 3 is partially overlapped with the lead frame 1 and is welded to the lead frame 1. The tantalum chip capacitor also has a cathode lead frame 114, the inside of which is attached to the tantalum element 5 and the outside end of which extends to the outside of the package 112. In the same manner as that described for the anode lead frame 1, the outside end of the cathode lead frame 114 forms a mounting terminal for surface-mounting the tantalum chip capacitor on the circuit board. After the anode lead frame 1 is welded to the lead wire 3 of the tantalum element 5 and the cathode lead frame 114 is attached to the tantalum element 5, an epoxy molding process is performed to form an package enclosing the tantalum element 5, the anode lead wire 3, the anode lead frame 1, and the cathode lead frame 114. In such a case, since the mounting terminals of the anode and cathode lead frames 1 and 114 are exposed outside the package, it is possible to surface-mount the tantalum chip capacitor on a circuit board using the mounting terminals.

If the tantalum chip capacitor of FIG. 4 according to the preferred embodiment of this invention is a small-sized capacitor having a size of 2.0×1.2 mm, the enclosed part of the anode lead frame 1 has a length "F" of 0.4 mm, and the tantalum element 5, has a length "P" of 0.78 mm. In such a case, the enclosed length "F" of the lead frame 1 is a length from the inside end of the lead frame 1 to the outside edge of the package. In, addition, the depth "β" of the cut groove of the cut-grooved anode lead frame 1 of FIG. 5b is preferably set to 4% or more of the length "F" of the enclosed part of the anode lead frame 1, which is selected as a reference length. The depth "β" of the cut groove should be determined such that the lengthening of the tantalum element as much as the depth "β" due to the cut groove can lead to the impedance drop of the tantalum chip capacitor. In addition, in order to accomplish desired welded strength of the anode lead frame 1, it is preferable to set the maximum depth "β" of the cut groove to 50% of the reference length "F". The width "α" of the cut groove of the anode lead frame 1 is changed in accordance with the width of the anode lead wire 3, but is preferably set to 0.05 mm or more in the present invention.

Figure 6:
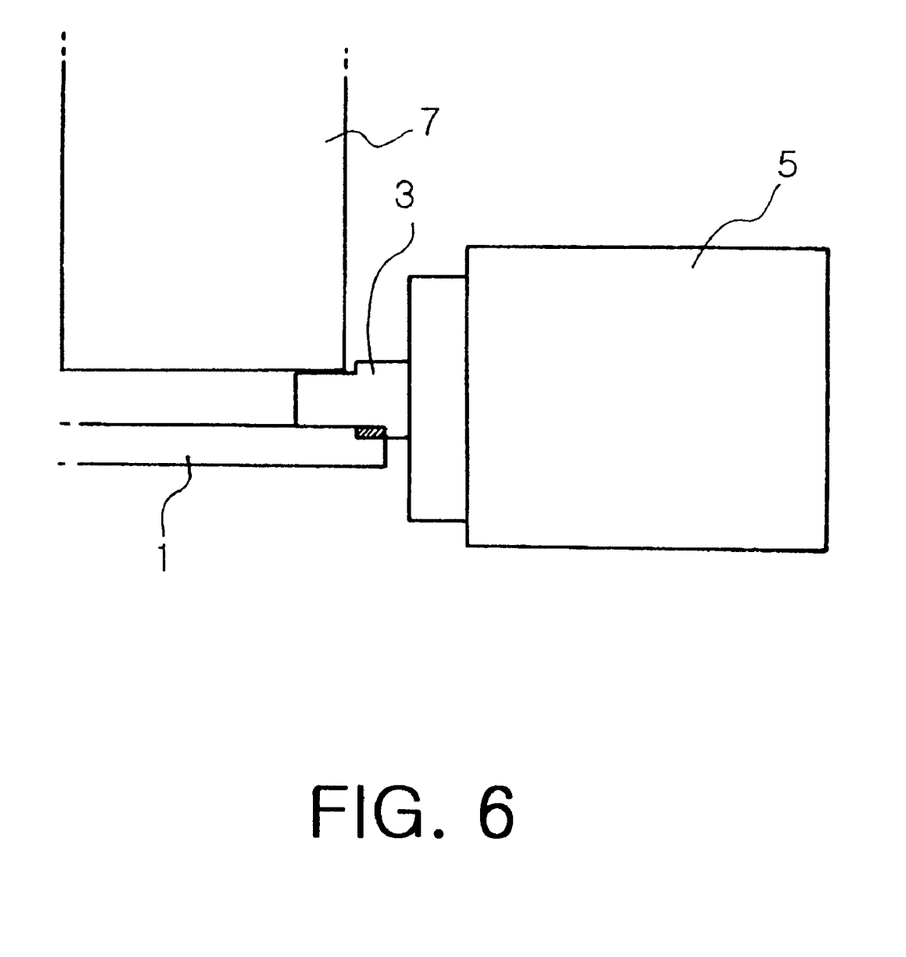
FIG. 6 is a view showing a process of welding the anode lead frame to the tantalum element of the tantalum chip capacitor of this invention.

FIG. 6 is a view showing a process of welding the anode lead frame 1 to the anode lead wire 3 of the tantalum element of this invention. As shown in the drawing, the anode lead wire 3 is welded to the anode lead frame 1 through a spot welding process using an electrode welding rod 7 after partially overlapping the lead wire 3 on the lead frame 1.

Since the tantalum chip capacitor of this invention uses such a cut-grooved,anode lead frame 1, it is possible for the capacitor to use a tantalum element 5 having a desired size while firmly holding the lead frame 1 even though the capacitor has a small-sized package. That is, the enclosed length "F" of the lead frame 1 of this tantalum chip capacitor remains the same as that of a conventional tantalum chip capacitor, but the welded area, at which the lead frame 1 is welded to the lead wire 3, is moved outward from the position of the welded area of the conventional tantalum chip capacitor due to-the cut groove of the lead frame 1. In such a case, the bending line of the lead wire 3 is also moved outward from a position of the conventional bending line. Since the bending line of the lead wire 3 is formed at the position moved outward from the conventional position, it is possible to increase the length "P" of the tantalum element 5 as much as the depth of the cut groove. This increases the volume of the tantalum element 5.

Even though the anode lead frame 1 of this invention has the cut groove at its inside end, the enclosed length "F" of the lead frame 1 inside the epoxy mold package remains the same as that of a conventional lead frame. Therefore, the area at which the anode lead frame 1 is integrated with the epoxy mold package is not reduced, and so the package firmly holds the anode lead frame 1.

An experiment for measuring the impedance characteristics of a tantalum chip capacitor with an anode lead frame having a V-shaped cut groove and a conventional tantalum chip capacitor with a straight anode lead frame was performed. The results are given in Table 1. The impedance characteristics of this tantalum chip capacitor will be described hereinbelow with reference to Table 1 and FIG. 7, which is a graph showing the impedance characteristics of this tantalum chip capacitor in comparison with the conventional tantalum chip capacitor.

TABLE 1

| | Element length (P, mm) | Element volume (mm$^3$) | Bending length (G, mm) | Welding length (H, mm) | Shape | Remarks |
|---|---|---|---|---|---|---|
| Conventional lead frame | 0.78 | 0.6552 | 0.35 | 0.30 | Straight edge | |
| The present lead frame | 0.93 | 0.7812 | 0.25 | 0.20 | V-shaped cut groove | |

In Table 1, the bending length "G" is a length from the bending line of the lead wire 3 to the outside edge of the package, and the welding length "H" is a length from the outside edge of the package to the welding line at which the welded area starts.

From the Table 1, it is apparent that the bending length and the welding length of this tantalum chip capacitor having the frame with the V-shaped cut groove are each reduced by about 0.1 mm in comparison with the conventional tantalum chip capacitor having the straight lead frame. Due to such a reduction in the bending length and the welding length, it is possible to increase the length and volume of the tantalum element.

Figure 7:
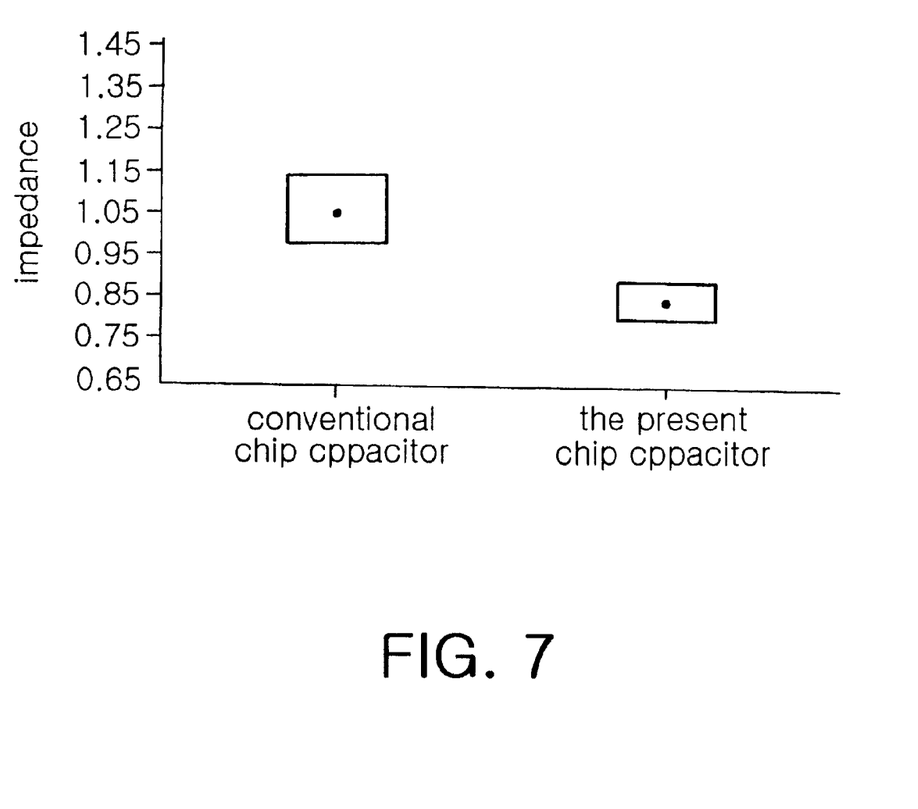
FIG. 7 is a graph showing the impedance characteristics of the tantalum chip capacitor of this invention in comparison with a conventional tantalum chip capacitor.

As shown in FIG. 7 showing the impedance characteristics of this tantalum chip capacitor and the conventional tantalum chip capacitor, the impedance of the conventional tantalum chip capacitor is about 0.97~1.15 Ω, while the impedance of the tantalum chip capacitor according to this invention is about 0.76~0.87 Ω. It is thus apparent that this tantalum chip capacitor desirably drops the impedance by at least 20% in comparison with the conventional tantalum chip capacitor.

When the impedance of the tantalum chip capacitor is dropped as described above, it is possible to remove noise from electronic equipments, such as communication equipments having the tantalum chip capacitors. If the impedance of the tantalum chip capacitor is dropped to zero, the maximum noise reduction effect can be accomplished. Such an impedance drop of the tantalum chip capacitor is also advantageous in that it enlarges the allowable range of a ripple voltage in electronic equipments having such tantalum chip capacitors.

As described above, the present invention provides a tantalum chip capacitor with a cut-grooved anode lead frame. In the tantalum chip capacitor of this invention, the anode lead frame has a cut groove at the center of its inside end and is welded to the anode lead wire of a tantalum element at the inside end, and so it is possible to move the welded area of the anode lead wire outward from a position of the conventional welded area. The tantalum chip capacitor of this invention thus uses a tantalum element having a desired size.

The tantalum chip capacitor with the cut-grooved anode lead frame does not experience the increase of impedance regardless of a reduction in the size of the capacitor according to the recent trend of smallness of such capacitors. That is, due to the cut-grooved anode lead frame, the impedance of the tantalum chip capacitor of this invention is desirably dropped by at least 20% in comparison with a conventional tantalum chip capacitor having the same size as that of this tantalum chip capacitor. Therefore, the present invention provides tantalum chip capacitors having improved performance.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A tantalum chip capacitor, comprising:

a tantalum element produced using tantalum oxide as a dielectric substance;

an anode lead wire extending outward from a side surface of said tantalum element, and having at least a substantially flat surface in an end portion thereof;

a cathode lead frame having an inside end attached to said tantalum element and an outside end formed as a mounting terminal for surface mounting the tantalum chip capacitor on a circuit board;

an anode lead frame having an inside end formed with a cut groove at a center thereof, and an outside end formed as another mounting terminal for surface mounting the tantalum chip capacitor on the circuit board, wherein the inside end of said anode lead frame is placed on and partially overlaps the flat surface of said anode lead wire so that a portion of said anode lead wire is partially received in the groove, and the inside end of said anode lead frame is welded to said anode lead wire in the overlapping region; and a mold package enclosing the tantalum element, the anode lead wire, a part of the cathode lead frame attached to the tantalum element, and a part of the anode lead frame welded to the anode lead wire;

wherein said cut groove of the anode lead frame has a depth set to 4%~50% of a reference length which is a length of the part of the anode lead frame enclosed in said package.

2. The tantalum chip capacitor according to claim 1, wherein said cut groove of the anode lead frame has a V-shaped profile or an arc-shaped profile.

3. The tantalum chip capacitor according to claim 1, wherein said inside end of the anode lead frame is welded to said anode lead wire by spot welding.

* * * * *